(12) United States Patent
Fay, II et al.

(10) Patent No.: US 11,013,174 B2
(45) Date of Patent: May 25, 2021

(54) FLOATATION ADJUSTMENT DEVICE

(71) Applicant: CNH Industrial America LLC, New Holland, PA (US)

(72) Inventors: Jeffrey Brown Fay, II, Oxford, PA (US); Ryan M. Figgins, New Holland, PA (US); Daniel Mark Geesey, East Petersburg, PA (US); Cecil Sudbrack, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 201 days.

(21) Appl. No.: 16/407,286

(22) Filed: May 9, 2019

(65) Prior Publication Data

US 2020/0352096 A1    Nov. 12, 2020

(51) Int. Cl.
| | |
|---|---|
| *A01D 34/74* | (2006.01) |
| *A01D 34/28* | (2006.01) |
| *A01B 63/00* | (2006.01) |
| *A01D 67/00* | (2006.01) |
| *A01D 41/14* | (2006.01) |

(52) U.S. Cl.
CPC ............ *A01D 34/74* (2013.01); *A01B 63/008* (2013.01); *A01D 34/283* (2013.01); *A01D 41/145* (2013.01); *A01D 67/00* (2013.01)

(58) Field of Classification Search
CPC .... A01D 34/74; A01D 41/145; A01D 34/283; A01D 34/28; A01D 67/00; A01D 34/24; A01D 34/54; A01B 63/008; A01B 63/04
See application file for complete search history.

(56) References Cited

U.S. PATENT DOCUMENTS

| | | | | |
|---|---|---|---|---|
| 2,187,051 | A | * | 1/1940 | Peacock ................. A01B 13/16 111/83 |
| 3,168,800 | A | | 2/1965 | Dyrdahl |
| 3,410,063 | A | * | 11/1968 | Speiser ................. A01D 34/43 56/7 |
| 3,599,406 | A | | 8/1971 | Akgulian et al. |
| 4,085,571 | A | | 4/1978 | Mortier et al. |
| 4,206,582 | A | | 6/1980 | Molzahn et al. |
| 5,327,709 | A | | 7/1994 | Webb |
| 6,244,027 | B1 | | 6/2001 | McClure et al. |
| 6,449,936 | B1 | * | 9/2002 | Anstey ................. A01D 89/004 56/341 |

(Continued)

FOREIGN PATENT DOCUMENTS

| | | |
|---|---|---|
| DE | 1185410 B | 1/1965 |
| EP | 2436256 A1 | 4/2012 |

(Continued)

*Primary Examiner* — Thomas B Will
*Assistant Examiner* — Madeline Ivy Runco
(74) *Attorney, Agent, or Firm* — Patrick Sheldrake; Peter Zacharias (57) ABSTRACT

An eccentric mount is used to adjust floatation force applied to a cutter bar of a pull type mower when the cut height of the cutter bar is changed. The eccentric mount is rotated to increase or decrease the tension on springs suspending the cutter bar. The eccentric mount is calibrated to adjust incrementally in relation to the position of the skid shoes to provide a floatation force to the cutter bar appropriate to the cutter height as determined by the spring shoe setting.

18 Claims, 10 Drawing Sheets

(56) References Cited

U.S. PATENT DOCUMENTS

| | | | | |
|---|---|---|---|---|
| 6,539,696 | B2* | 4/2003 | Blakeslee | A01D 78/005 |
| | | | | 56/375 |
| 6,655,118 | B1* | 12/2003 | Thompson | A01D 43/107 |
| | | | | 56/15.8 |
| 7,877,976 | B2* | 2/2011 | Honas | A01D 57/20 |
| | | | | 56/208 |
| 8,601,779 | B1* | 12/2013 | Figgins | A01D 34/283 |
| | | | | 56/181 |
| 2016/0014963 | A1 | 1/2016 | Totten et al. | |
| 2016/0270285 | A1* | 9/2016 | Hennes | A01B 49/027 |
| 2019/0193793 | A1* | 6/2019 | Stover | B62D 25/088 |

FOREIGN PATENT DOCUMENTS

| | | | |
|---|---|---|---|
| GB | 1374702 | A | 11/1974 |
| GB | 773378 | A | 4/1995 |

\* cited by examiner

FLOATATION ADJUSTMENT DEVICE

FIELD OF THE INVENTION

This invention concerns devices for adjusting the floatation force applied to cutter bars of pull type mowers.

BACKGROUND

It is advantageous to equip pull-type mowers with adjustable skid shoes. Adjustable skid shoes allow an operator to make adjustments to the mower cut height by raising or lowering the skid shoes on the cutter bar. In an example embodiment, the adjustment is effected by pivoting the skid shoe to an orientation angle corresponding to the desired cutter height and then fixing the angle of the skid shoe. These adjustments, by design, do not require tools and can be made quickly and easily by one operator. While it is desirable to have to ability to quickly adjust the cut height of the cutter bar, these adjustments can greatly affect the floatation (suspension) of the cutter bar. When the skid shoes are adjusted down in the adjustment array, the cutter bar cut height rises, which in turn reduces the elongation of floatation springs which compensate for a portion of the weight of the cutter bar. This adjustment, in turn, reduces the floatation force the springs apply to the cutter bar, thus increasing the ground force of the cutter bar. This problem is exacerbated by the design of most adjustable skid shoes, which tend to have a much smaller ground contact area than traditional skid shoes mounted over very nearly the entirety of the bottom of the cutter bar.

There is clearly an opportunity to provide a system which will allow rapid changes in the floatation setting of spring floatation systems on pull-type mowers to provide an optimized floatation setting when making adjustments to cut height with adjustable skid shoes.

SUMMARY

The invention concerns a floatation adjustment device useable, for example, with agricultural mowers. One example floatation adjustment device comprises a floatation mechanism, a perch, a shaft and an eccentric mount comprising a center axis. In this example the perch is in direct or indirect contact with the eccentric mount. The shaft is operably connected to the floatation mechanism and the shaft is operably connected to the eccentric mount at an at least one linkage point. The at least one linkage point is not concentric to the center axis and the position of the floatation mechanism relative to the spring perch is dependent on the orientation of the eccentric mount relative to the spring perch.

In one example embodiment the perimeter of the eccentric mount is a polygon with at least about three sides. In another example, the perimeter of the eccentric mount is a polygon with at least about six sides.

By way of example the eccentric mount may further comprise at least a first and a second longitudinal end and at least one bar comprising at least a first and a second end. In an example embodiment, the at least two longitudinal ends are in a spaced relation to each other. The first longitudinal end is mechanically linked to the first end of the bar and the second longitudinal end is mechanically linked to the second end of the bar.

In an example embodiment of a floatation adjustment device, the floatation mechanism comprises a spring adjusting rod and a floatation spring assembly. By way of example the perch is positioned between the eccentric mount and the floatation spring assembly. Further by way of example the perch may have a shape that corresponds to at least a portion of a shape defined by the perimeter of the eccentric mount.

In an example embodiment, the eccentric mount may further comprise an at least one longitudinal end wherein the at least one longitudinal end comprises a tool catching structure. By way of example the tool catching structure may comprise at least two protruding sides in spaced relation to each other.

An example floatation adjustment device according to the invention may further comprise a pin, wherein the perimeter of the eccentric mount is circular and defines an array of holes and wherein the perch comprises at least one hole.

The invention also encompasses a header. In an example embodiment the header comprises a floatation adjustment device comprising an eccentric mount comprising a center axis, a shaft, a perch and a floatation mechanism comprising a first and a second end. In an example embodiment the perch is in direct or indirect contact with the eccentric mount. The shaft is mechanically linked to the first end of the floatation mechanism and the shaft is mechanically linked to the eccentric mount at an at least one linkage point. By way of example the at least one linkage point is not concentric to the center axis. The position of the floatation mechanism relative to the spring perch is dependent on the orientation of the eccentric mount relative to the spring perch.

The header further comprises a frame and a skid shoe adjustment mechanism comprising a skid shoe. The perch is mechanically connected to the frame in this example.

In an example header embodiment the skid shoe adjustment mechanism aligns the skid shoe into a finite number of skid shoe positions. In a particular example the perimeter of the eccentric mount is a polygon with at least about three sides. Further by way of example the eccentric mount has the same number of sides as the finite number of skid shoe positions. In yet another example embodiment the eccentric mount has one more side than the finite number of skid shoe positions.

In an example header according to the invention the skid shoe adjustment mechanism aligns the skid shoe into a finite number of skid shoe positions. The floatation adjustment device further comprises a pin. In a specific example the perimeter of the eccentric mount is circular and the eccentric mount comprises a plurality of holes arranged in an array. The perch comprises at least one hole. The pin is inserted into one of the plurality of holes in the eccentric mount and at least one hole in the perch to positionally align the eccentric mount relative to the perch. In a particular example embodiment the number of holes is the same as the finite number of skid shoe positions.

In an example header embodiment according to the the floatation mechanism comprises a spring adjusting rod and a floatation spring assembly. By way of example the perch is positioned between the eccentric mount and the floatation spring assembly. In an example embodiment the eccentric mount further comprises at least one longitudinal end. The at least one longitudinal end may comprise a tool catching structure. The tool catching structure may comprise at least two protruding structures in spaced relation to each other.

DETAILED DESCRIPTION

Figure 1:
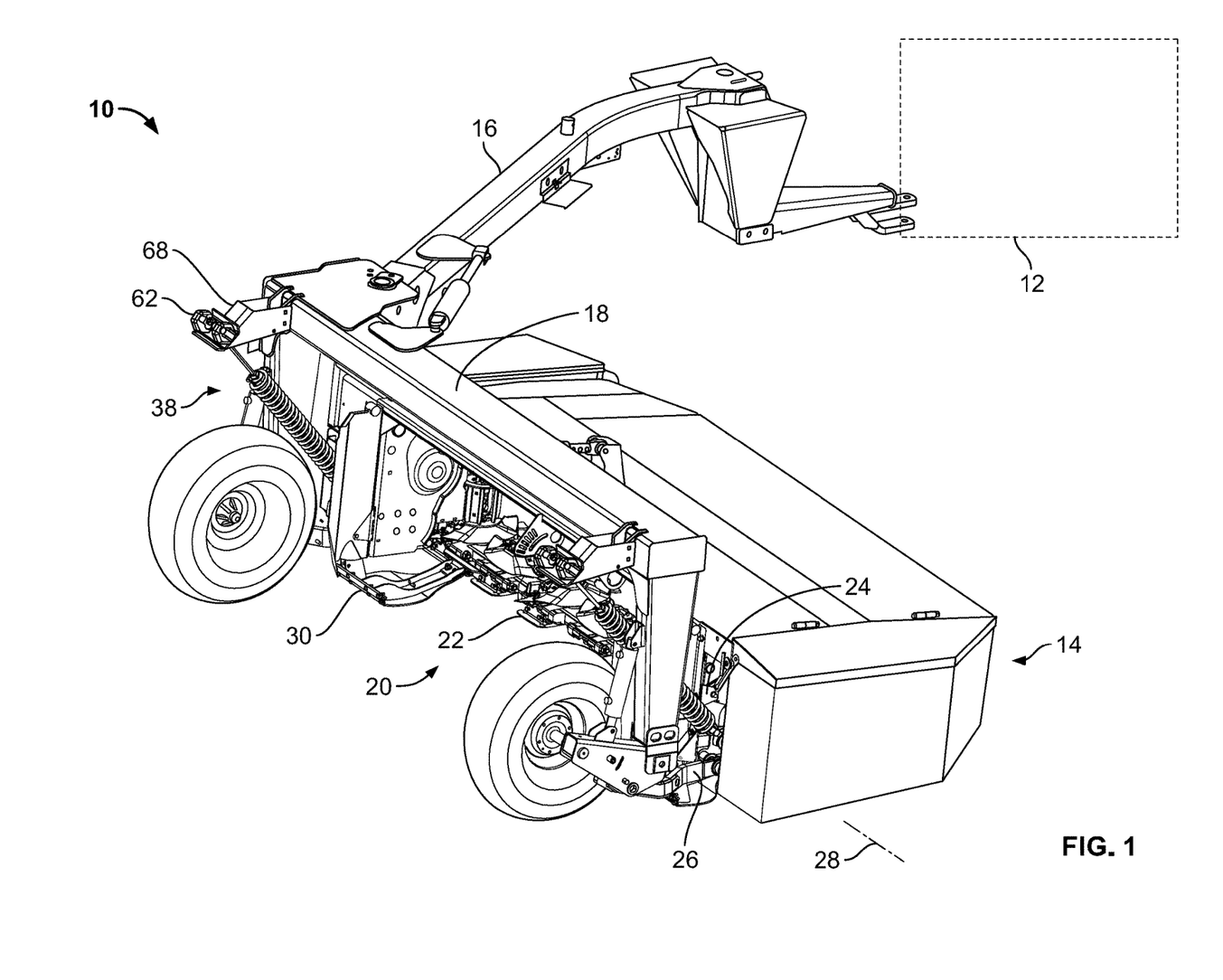
FIG. 1 is an isometric view of a mower having an example floatation adjustment device according to the invention.
Figure 2:
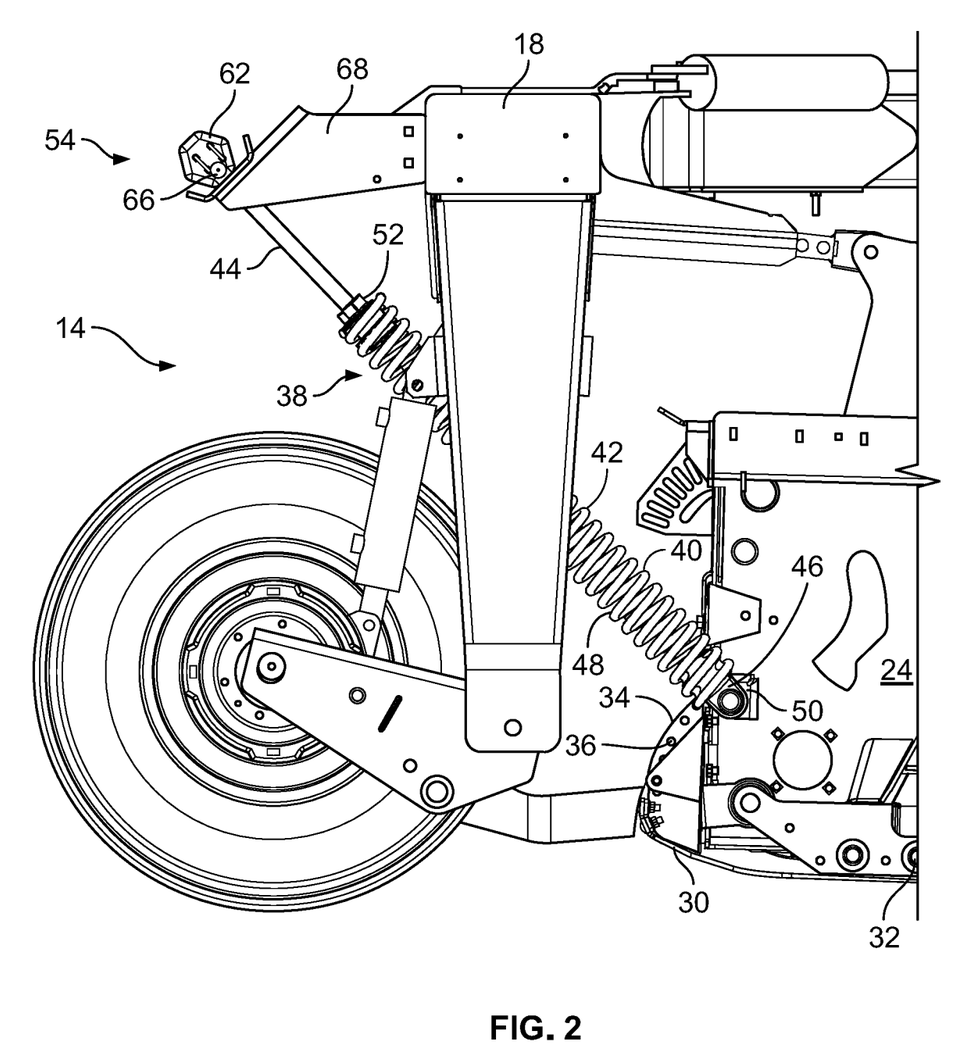
FIGS. 2 and 3 are side views of a portion of the mower showing a skid shoe in its lowest position and a skid shoe in its highest position respectively.
Figure 3:
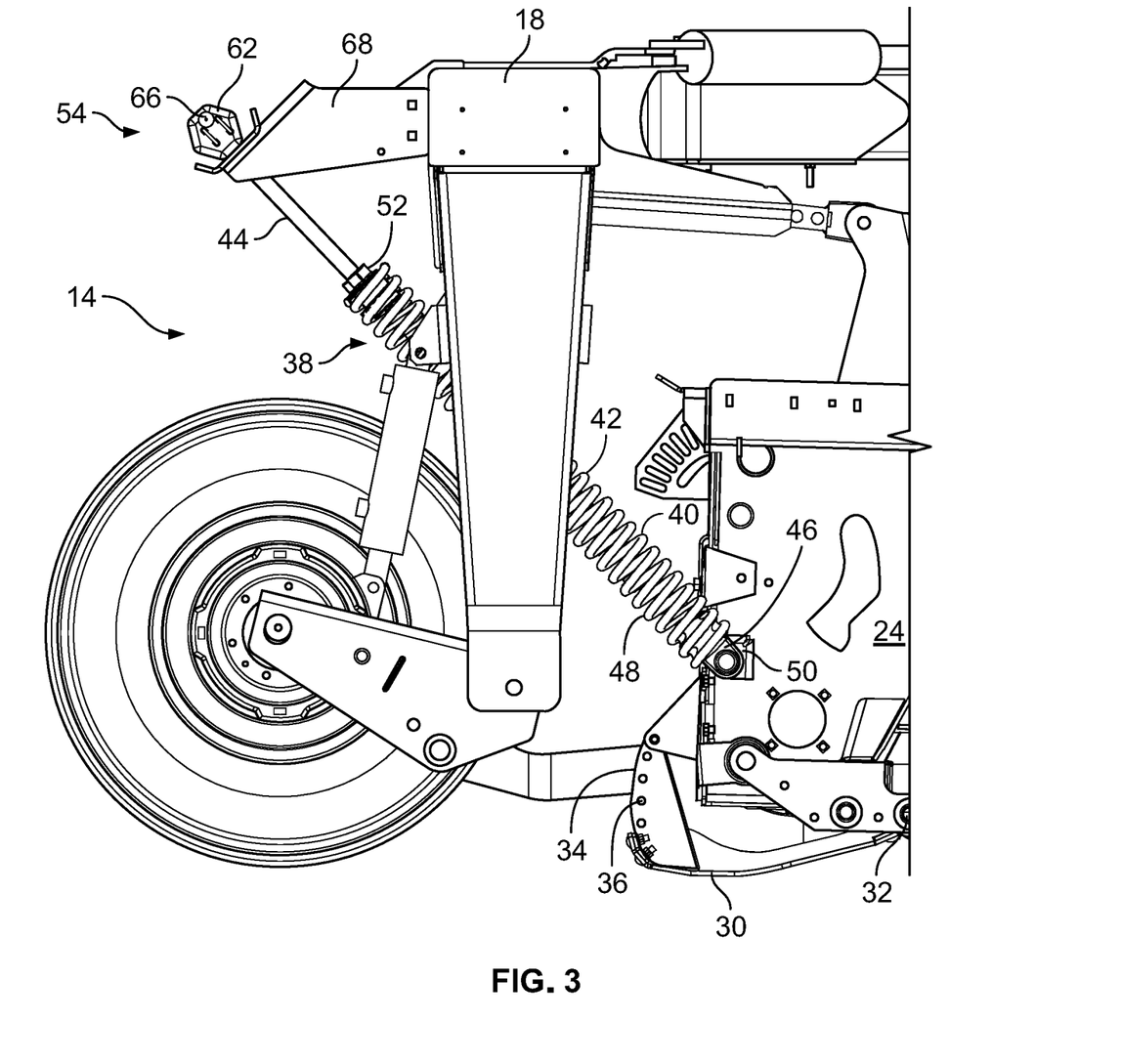

FIG. 1 shows an example pull-type mower 10 pulled by a tractor 12 (shown schematically). Mower 10 comprises a header 14 which is attached to the tractor 12 via a tongue 16. Header 14 comprises a trail frame 18 on which a cutter bar assembly 20 is mounted. Cutter bar assembly 20 includes a cutter bar 22 extending between chassis mounts 24, the mounts being pivotably attached to the trail frame 18 via links 26 extending between the chassis mounts and the trail frame. Links 26 pivot about axes 28 relative to trail frame 18 to permit the cut height of the cutter bar 22 to be set. As shown in FIGS. 2 and 3, the cut height is set by skid shoes 30 which are pivotably attached to chassis mounts 24. The skid shoes 30 are pivotable relative to chassis mounts 24 about axes 32 to set the cut height of the cutter bar 22 (shown in FIG. 1). The skid shoes 30 may be infinitely angularly adjustable, or, as shown in this example, adjustable between a number of discrete positions determined by an adjustment plate 34 having an array of holes 36 defining a number of discrete cutter bar heights. FIG. 2 illustrates the skid shoe 30 in the lowest setting, corresponding to a low cutter bar height, and FIG. 3 shows it in the highest setting corresponding to the highest cutter bar height.

As shown in FIGS. 1-3, header 14 further comprises a floatation adjustment device 38. Floatation adjustment device 38 extends between the trail frame 18 and the chassis mounts 24. The cutter bar 22 is thus suspended from the trail frame 18 by the floatation adjustment device 38 which compensates for the weight of the cutter bar assembly 20 so that it is not borne entirely by the skid shoes 30. The skid shoes are said to "float" on the ground and thereby easily accommodate irregular terrain, hence the term "floatation adjustment device". The floatation adjustment device 38 allows the force on the cutter bar assembly 20 to be adjusted to compensate for different cutter bar heights to maintain the suspension force on the cutter bar assembly constant regardless of cutter bar height.

Figure 4:
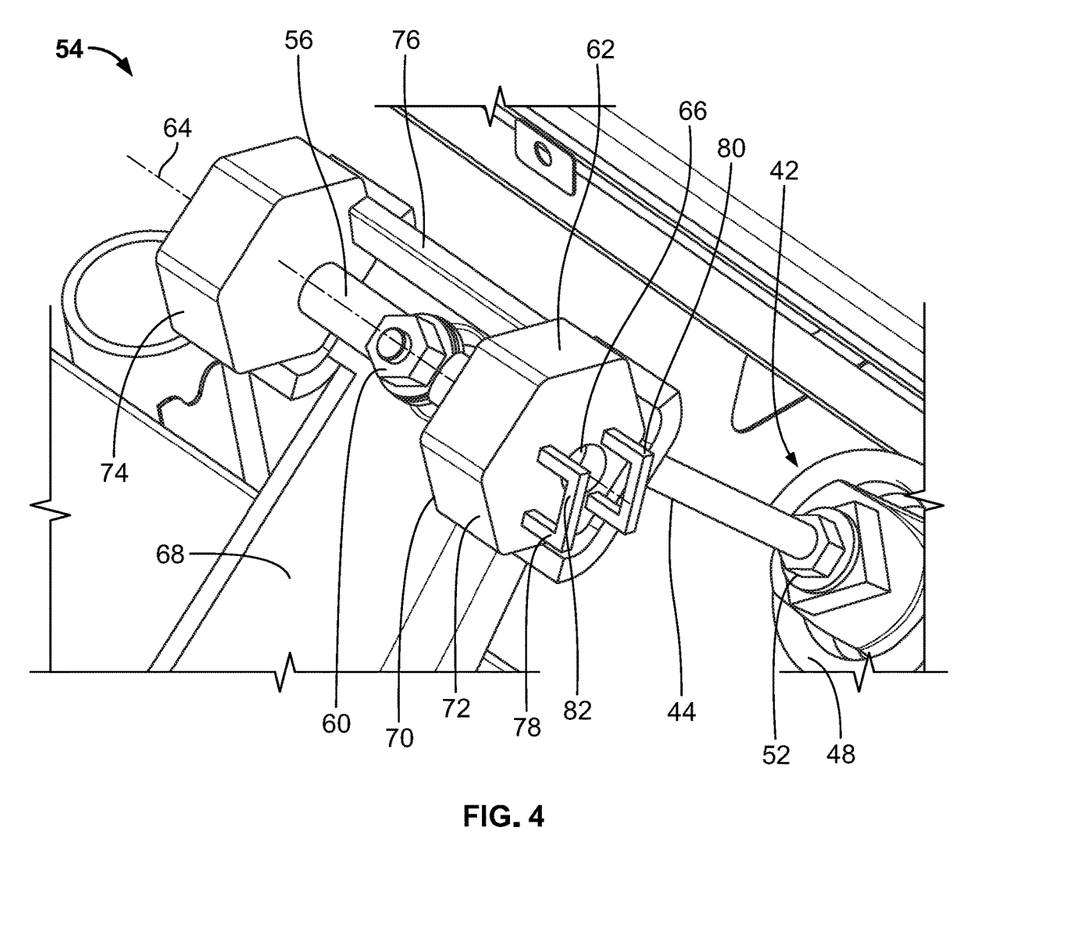
FIG. 4 is an isometric view of the example floatation device of FIG. 1.
Figure 5:
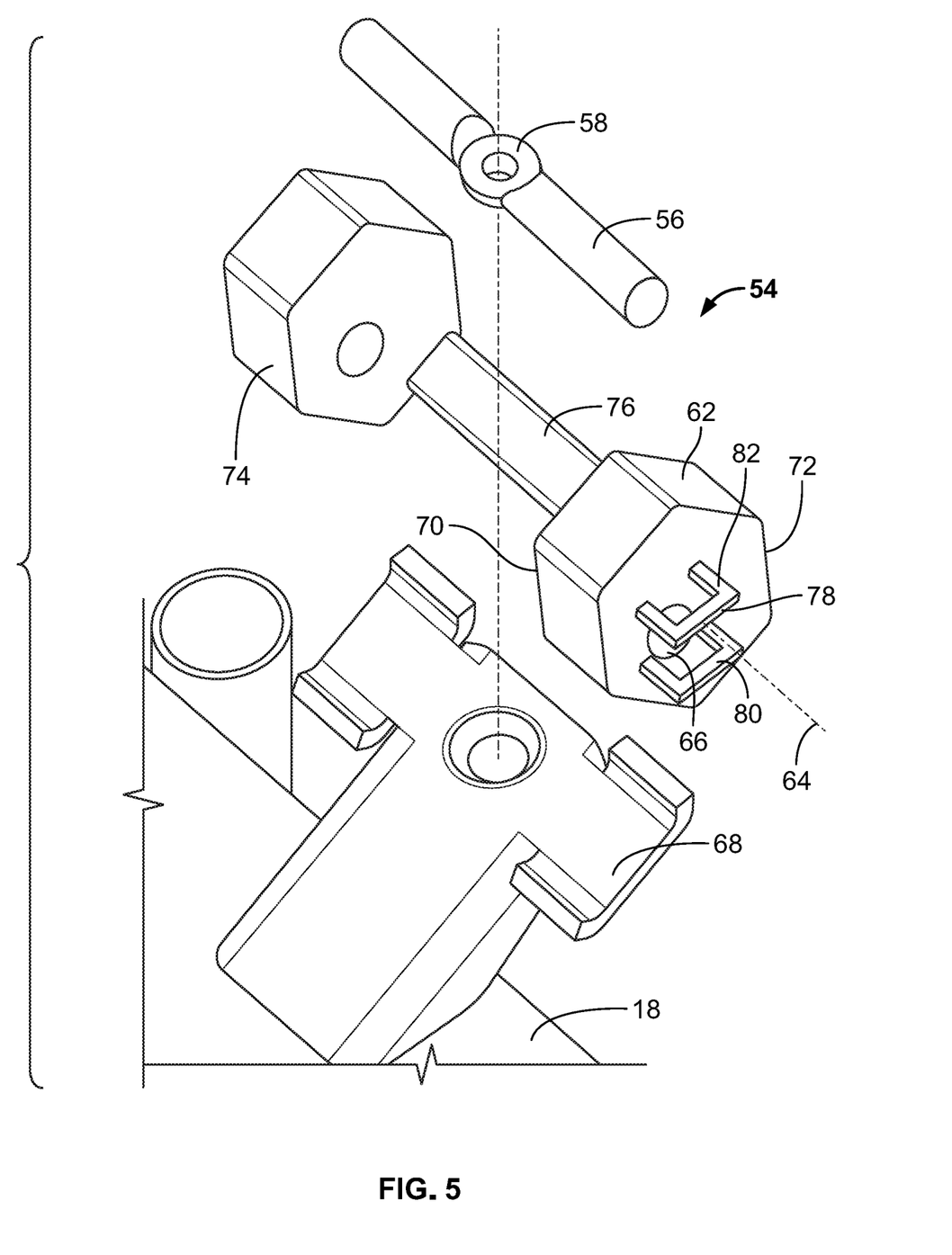
FIG. 5 is an exploded isometric view of the example floatation device of FIG. 1.

Floatation adjustment device 38 includes a floatation mechanism 40. In this example embodiment, floatation mechanism 40 comprises a floatation spring assembly 42 and a spring adjusting rod 44. Spring assembly 42 includes a lug 46 attached to one end of a spring 48. Lug 46 is pivotably attached to a clevis 50 mounted on the chassis mount 24 of the cutter bar assembly 20. A threaded fitting 52 is fixedly attached to the opposite end of spring 48 and receives one end of the spring adjusting rod 44, also threaded. As shown in FIGS. 2-4, the opposite end of the spring adjusting rod 44 is operatively engaged with an adjustment mechanism 54. As shown in FIGS. 4 and 5, the adjustment mechanism 54 comprises a shaft 56 which is oriented transversely to the rod 44. Rod 44 is received within an opening 58 and is secured to the shaft 56 by a threaded nut 60. Shaft 56 is operatively connected to an eccentric mount 62. Eccentric mount 62 comprises a center axis 64 oriented substantially parallel to the shaft 56 and the shaft 56 is operably connected to the eccentric mount 62 at at least one linkage point 66 which is not concentric to the center axis 64. Eccentric mount 62 is supported on a perch 68 mounted on the trail frame 18. In this example the perch 68 is positioned between the eccentric mount and the floatation spring assembly 42. The eccentric mount may be in either direct or indirect contact with the perch. As explained below, the position of the floatation mechanism 40 relative to the perch 68 is dependent upon the orientation of the eccentric mount relative to the perch.

Figure 7:
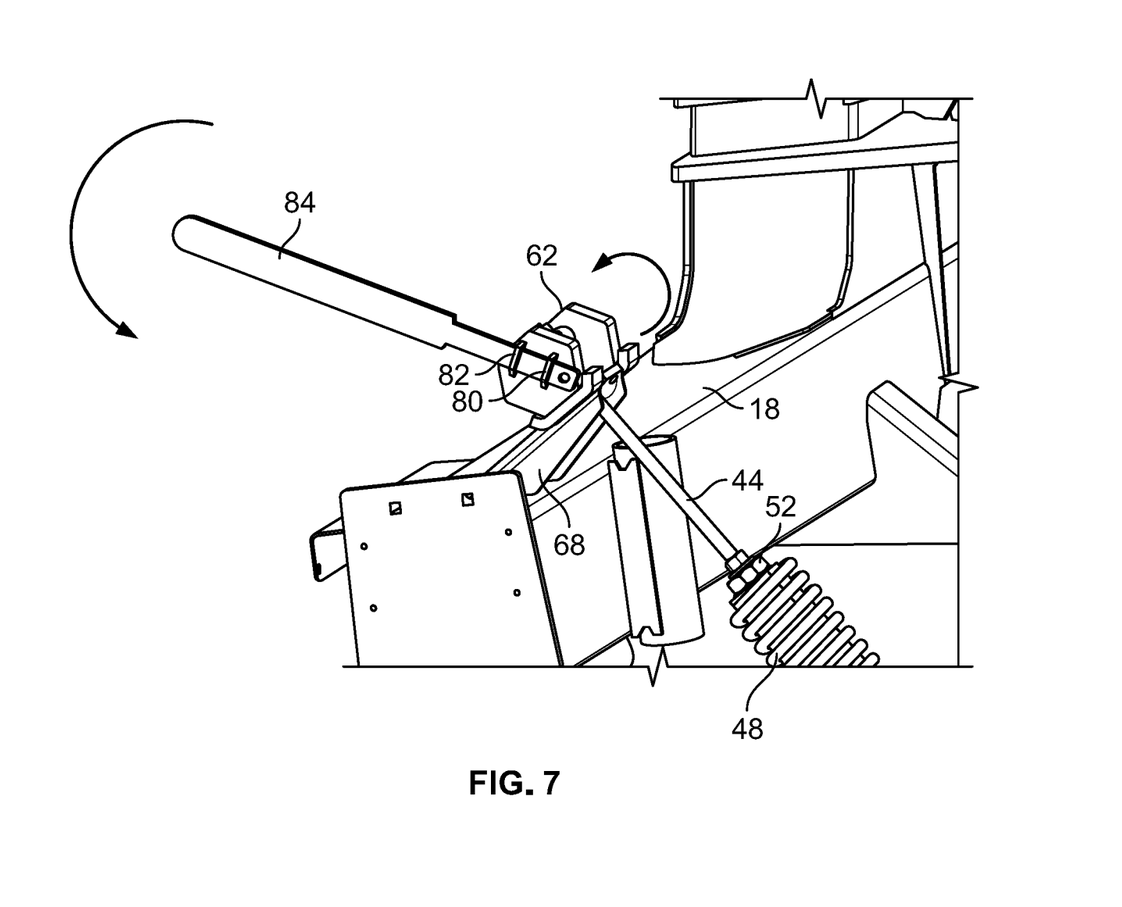
FIG. 7 is an isometric view showing a tool used to operate the example floatation device.

In this example embodiment the eccentric mount 62 has a polygonal perimeter 70 with at least 3 sides; in this case six sides. Eccentric mount 62 may further comprise first and second longitudinal ends 72 and 74 joined by at least one bar 76. Bar 76 has first and second oppositely disposed ends which are mechanically linked to the first and second longitudinal ends 72 and 74 to position the ends in spaced relation to one another. The perch 68 has a shape that corresponds to at least a portion of the shape defined by the perimeter 70. A tool catching structure 78 may be attached to one longitudinal end 72. The tool catching structure 78 comprises two sides 80, 82 protruding from longitudinal end 72 and positioned in spaced relation to one another for allowing a tool 84 to be used to move the eccentric mount 62 and thereby adjust the floatation mechanism 40 as shown in FIG. 7.

Figure 6A:
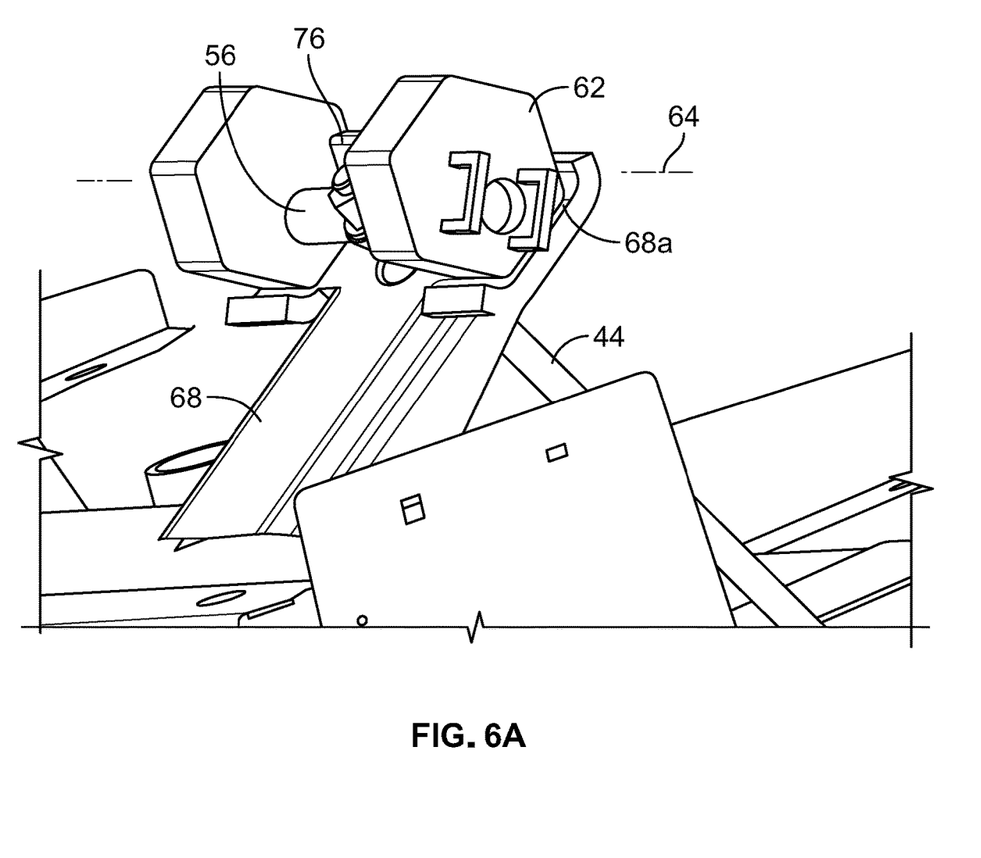
FIGS. 6A-6C are isometric views illustrating the example floatation device in operation.
Figure 6B:
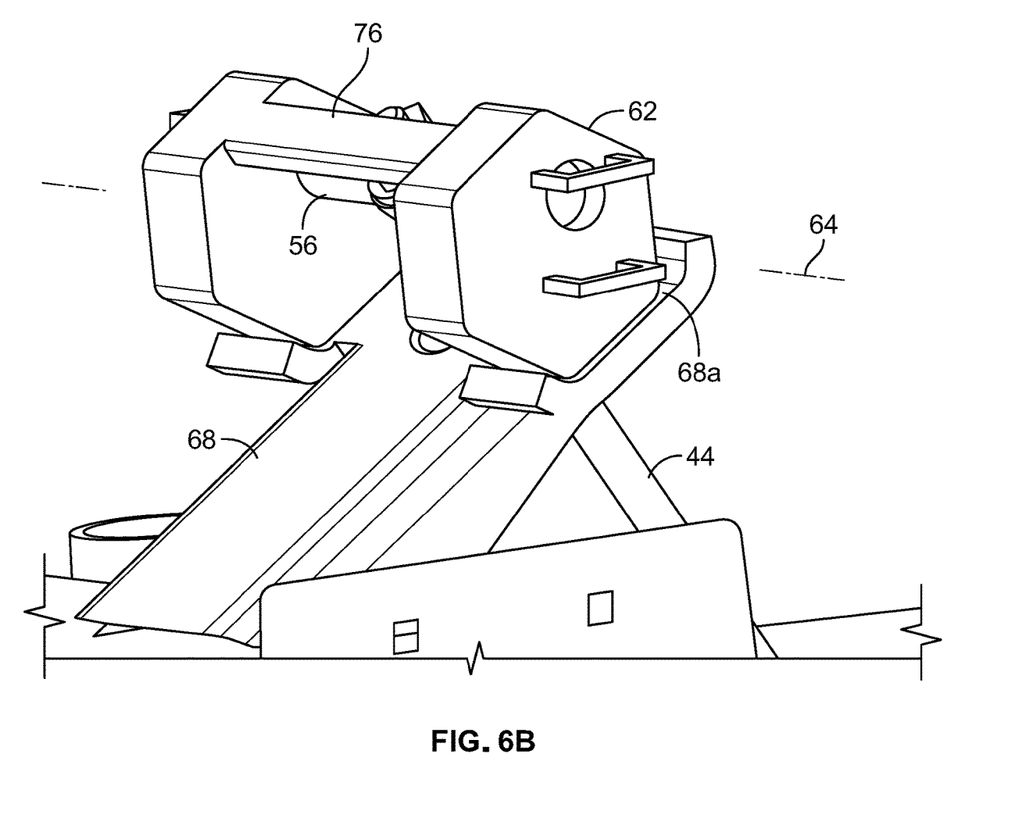
Figure 6C:
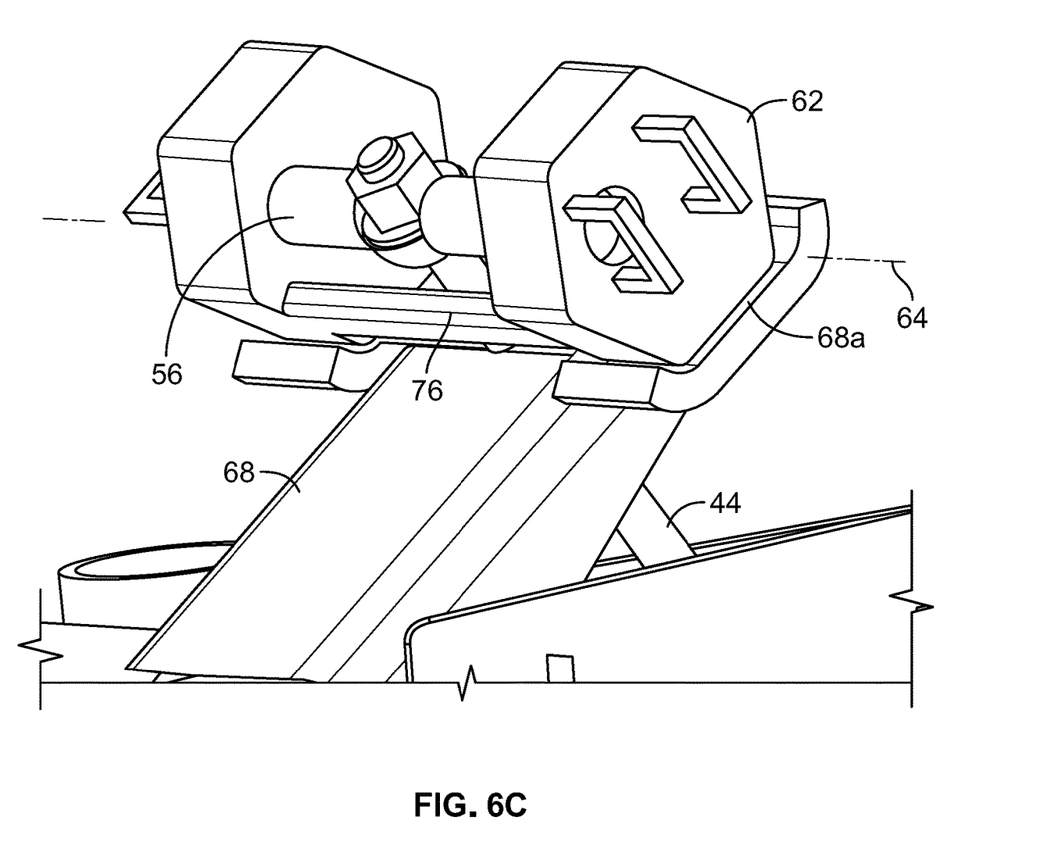

Operation of the eccentric mount 62 is illustrated in FIGS. 6A, 6B and 6C. Because the shaft 56 is eccentric to the center axis 64 and rotatable relative to the eccentric mount 62, rotation of the eccentric mount 62 about the center axis 64 moves the adjusting rod 44 axially, thereby increasing or decreasing the tension on the spring 48 and adjusting the suspension force on the cutter bar assembly 20 (see also FIG. 3). FIG. 6A shows the position of the eccentric mount 62 which places the least tension on spring 48, FIG. 6B shows the position of the eccentric mount which places more tension on the spring, and FIG. 6C shows the position of the eccentric mount which places the most tension on the spring. Note that the eccentric mount 62 is stable on the perch 68 in each of the positions and will hold the spring 48 at the desired tension because the perch has a shape that corresponds to at least a portion of the shape defined by the perimeter 70 of the eccentric mount 62. In this example the perimeter 70 is a hexagon with six flat sides and the perch 68 comprises a compatible flat surface 68a which receives the sides of the perimeter.

It is advantageous to size the eccentric mount 62 and the eccentricity of the shaft 56 relative to the center axis 64 such that at least some of the stable positions of the eccentric mount place tension on the spring 48 appropriate for a specific angular setting of the skid shoe, which also corresponds to the appropriate tension for a particular cutter height. For example, as shown in FIG. 3, the skid shoes 30 have five holes 36 allowing for five skid shoe settings corresponding to five different cutter heights. As shown in FIGS. 4 and 5, the eccentric mount 62 has six stable positions, five of which may be designed to place appropriate tension on the spring 48 corresponding to the five skid shoe settings and five cutter height settings. Thus in this example embodiment the eccentric mount 62 has one more side than the finite number of skid shoe positions. It is of course feasible for a polygonal eccentric mount to have the same number of sides as the finite number of skid shoe positions.

Figure 8:
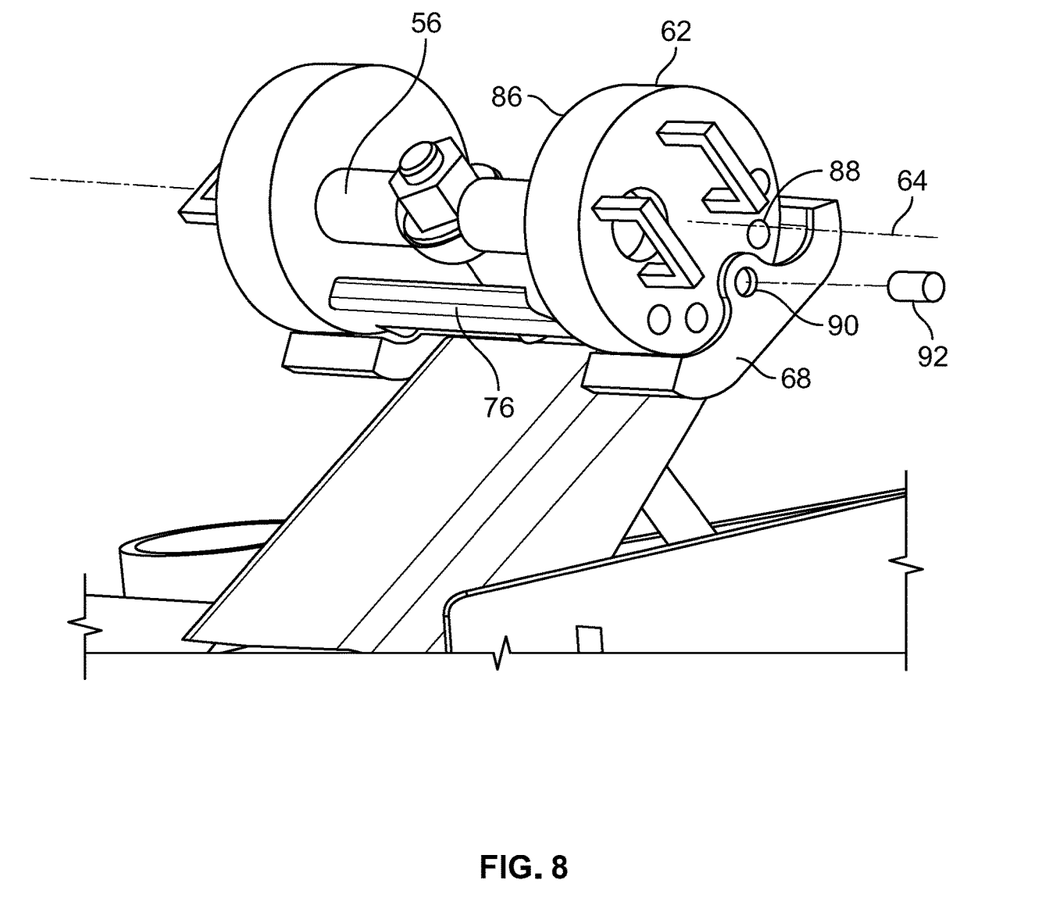
FIG. 8 is an isometric view showing another example embodiment of a floatation device according to the invention.

In another example embodiment shown in FIG. 8, the eccentric mount 62 has a circular perimeter 86. Mount 62 defines a plurality of holes 88 arranged proximate to the circular perimeter 86, each hole 88 being positionable so as to align with a hole 90 in perch 68 as the eccentric mount is rotated about center axis 64. A pin 92 is used to engage the hole 90 in perch 68 and one of the holes 88 in the eccentric mount 62 and thereby fix the position of the floatation mechanism 40. Similar to the polygonal eccentric mount, it is advantageous to design the size and eccentricity of the circular perimeter mount such that the number of holes 88 is the same as the finite number of skid shoe positions, and further, that each hole 88, when aligned with hole 90 of the perch 68 applies tension to the spring 48 appropriate to one of the settings of the skid shoes. It is of course feasible for the eccentric mount to have fewer holes or fewer sides than the finite number of skid shoe positions, in which case each eccentric mount position will apply a spring tension appropriate over a range of two or more shoe settings.

Using a floatation adjustment device 38 according to the invention, an operator sets the adjustable skid shoes 30 to the lowest setting (FIG. 2), where the cutter bar 22 is able to down float to the lowest position for lowest cut height. The eccentric mount 62 is also adjusted to its lowest setting, applying the least amount of spring tension and thus the least floatation force. The operator then adjusts the floatation to recommended "weight" for the model of mower in question. This is done by turning nut 60, which rests on the spring perch 68 and is threaded onto the spring adjusting rod 44. The flotation adjustment device is now ready for use.

In operation the operator raises the header 14, suspending the skid shoes 30 off the ground and allowing the floatation springs to fully retract. The operator then adjusts the skid shoes to the level appropriate to the desired cut height, and notes which particular hole of holes 36 in adjustment plate 34 is used to fix the position of skid shoes 30. The operator then rotates the eccentric mount 62 on the spring perch 68 to the position corresponding to the skid shoe setting. If the lift geometry is such that the operator is not able to rotate the eccentric mount by hand, it is assumed that a simple tool 84, such as a pry bar, can be provided to enable the operator to rotate the eccentric mount (FIG. 7).

Optimum floatation is expected to reduce skid shoe wear, reduce wear and tear on frame and header components, and reduce ground damage. The offset of the various eccentric settings can be made to match the change in cut height very precisely, whereas a system where the operator makes the adjustment will require that he recheck the floatation every time he makes an adjustment to cut height, rather than simply matching the skid shoe setting to eccentric setting. Large floatation adjustments can still be made with an impact wrench, which makes maintenance much quicker, such as when the spring assembly has to be disassembled.

What is claimed is:
1. A floatation adjustment device comprising:
   a floatation mechanism;
   a perch;
   a shaft; and
   an eccentric mount comprising a center axis;
   wherein the perch is in direct or indirect contact with the eccentric mount;
   wherein the shaft is operably connected to the floatation mechanism;
   wherein the shaft is operably connected to the eccentric mount at an at least one linkage point;
   wherein the at least one linkage point is not concentric to the center axis; and
   wherein the position of the floatation mechanism relative to the perch is dependent on the orientation of the eccentric mount relative to the perch.
2. The floatation adjustment device of claim 1, wherein the perimeter of the eccentric mount is a polygon with at least three sides.
3. The floatation adjustment device of claim 2, wherein the perimeter of the eccentric mount is a polygon with at least six sides.
4. The floatation adjustment device of claim 1, wherein the eccentric mount further comprises:
   at least a first and a second longitudinal end; and
   at least one bar comprising at least a first and a second end;
   wherein the at least two longitudinal ends are in a spaced relation to each other;
   wherein the first longitudinal end is mechanically linked to the first end of the bar; and
   wherein the second longitudinal end is mechanically linked to the second end of the bar.
5. The floatation adjustment device of claim 1, wherein the floatation mechanism comprises:
   a spring adjusting rod; and
   a floatation spring assembly.
6. The floatation adjustment device of claim 5, wherein the perch is positioned between the eccentric mount and the floatation spring assembly.
7. The floatation adjustment device of claim 6, wherein the perch has a shape that corresponds to at least a portion of a shape defined by the perimeter of the eccentric mount.
8. The floatation adjustment device of claim 1, wherein the eccentric mount further comprises an at least one longitudinal end;
   wherein the at least one longitudinal end comprises a tool catching structure;
      wherein the tool catching structure comprises at least two protruding sides in spaced relation to each other.
9. The floatation adjustment device of claim 1, further comprising a pin;
   wherein the perimeter of the eccentric mount is circular and defines an array of holes;
   wherein the perch comprises at least one hole.
10. A header comprising:
   a floatation adjustment device comprising:
   an eccentric mount comprising a center axis;
   a shaft;
   a perch; and
   a floatation mechanism comprising a first and a second end;
   wherein the perch is in direct or indirect contact with the eccentric mount;
   wherein the shaft is mechanically linked to the first end of the floatation mechanism;
   wherein the shaft is mechanically linked to the eccentric mount at an at least one linkage point;
   wherein the at least one linkage point is not concentric to the center axis; and
   wherein the position of the floatation mechanism relative to the perch is dependent on the orientation of the eccentric mount relative to the perch.
   a frame; and
   a skid shoe adjustment mechanism comprising a skid shoe;
   wherein the perch is mechanically connected to the frame.

11. The header of claim 10,
wherein the skid shoe adjustment mechanism aligns the skid shoe into a finite number of skid shoe positions; and
wherein the perimeter of the eccentric mount is a polygon with at least about three sides.

12. The header of claim 11, wherein the eccentric mount has the same number of sides as the finite number of skid shoe positions.

13. The header of claim 11, wherein the eccentric mount has one more side than the finite number of skid shoe positions.

14. The header of claim 10,
wherein the skid shoe adjustment mechanism aligns the skid shoe into a finite number of skid shoe positions;
wherein the floatation adjustment device further comprises a pin;
wherein the perimeter of the eccentric mount is circular wherein the eccentric mount comprises a plurality of holes arranged in an array;
wherein the perch comprises at least one hole;
wherein the pin is inserted into one of the plurality of holes in the eccentric mount and at least one hole in the perch to positionally align the eccentric mount relative to the perch.

15. The header of claim 14, wherein the number of holes is the same as the finite number of skid shoe positions.

16. The header of claim 10, wherein the floatation mechanism comprises:
a spring adjusting rod; and
a floatation spring assembly.

17. The header of claim 10, wherein the perch is positioned between the eccentric mount and the floatation spring assembly.

18. The header of claim 10, wherein the eccentric mount further comprises:
an at least one longitudinal end;
wherein the at least one longitudinal end comprises a tool catching structure;
wherein the tool catching structure comprises at least two protruding structures in spaced relation to each other.

* * * * *